Pierre Majani
Alan V. Rushton
INVENTORS 3,291,247
ACOUSTIC LOGGING SYSTEMS
Pierre Majani, Maracaibo, and Alan V. Rushton, Caracas, Venezuela, assignors, by mesne assignments, to Schlumberger Technology Corporation, Houston, Tex., a corporation of Texas
Filed Jan. 26, 1960, Ser. No. 4,635
13 Claims. (Cl. 181—.5)

The present invention relates to acoustic logging apparatus and more particularly to acoustic apparatus for investigating acoustic coupling between a casing and a borehole.

In a typical well completion operation, a casing tubing or drill pipe is positioned in the borehole and cement pumped into the annulus defined between the casing and borehole. For various reasons, the cement may fail to completely fill the annulus along the length of the casing, which often results in a condition generally known as "channeling." Moreover, part or portions of the column of cement may fail to bond to the casing or formations. In such instances, fluids and/or gases from formations at other depths may migrate along the imperfections in the column of cement. Thus, if a production sand is completed as by perforation in a zone which includes such imperfections, migrating fluids and/or gases from other earth formations may impair the production of hydrocarbons from the sand.

In another typical instance, recovery operations for a "stuck" drill pipe, casing or the like often require a knowledge of the depth of the "stuck" point.

By means of the present invention, in the above instances, the acoustic coupling of material to the pipe string in the borehole, either cement bonding or the earth formations packing about the casing, is investigated to provide the desired information.

Accordingly, it is an object of the present invention to provide new and improved methods of determining locations behind a casing in a borehole at which materials are acoustically coupled to a casing.

A still further object of the present invention is to provide new and improved apparatus for determining locations behind a casing in a borehole at which materials are acoustically coupled to a casing.

An additional object of the present invention is to provide new and improved apparatus for determining by acoustic velocity techniques, the quality of a cement bond behind a casing.

Yet another object of the present invention is to provide new and improved means for locating imperfections in the cement column between the casing and borehole as well as determining which portions of the casing are not suitably cemented.

In the systems embodying the present invention, intercepted pulses of acoustic energy are compared to a standard in a selected time interval to obtain indications when the casing is acoustically coupled to the borehole. The standard may be a signal level, for example, determined by test measurements to fall between the levels of the intercepted pulses resulting respectively, from high and low quality acoustic coupling of surrounding materials to the casing. More particularly, in the apparatus there is provided a transmitter which is pulsed to generate acoustic energy for transmission through the various adjacent media or materials to a receiver. The receiver in response to acoustic energy develops an electrical signal typically consisting of a series of alternations having a characteristic first cycle with a first peak of small amplitude and a given polarity relative to a reference value, followed by a second peak of considerably larger peak amplitude with an opposite polarity. Subsequent cycles of the electrical signal generally have peak amplitudes which are relatively much larger than either the first or second peaks. Where the casing is "free," that is, the cement bond fails, or the spacing between the casing and borehole is open, a relatively large electrical signal is developed by the receiver. However, where the casing is acoustically coupled to the borehole, for example, by a good cement bond or, instances when the formation is tightly packed about the casing, the acoustic energy passing through the casing is apparently very greatly attenuated, as the amplitude of the electrical signal is decidedly decreased relative to an amplitude that one would expect.

In order to determine the presence of acoustic coupling, a first signal generating circuit is coupled to the receiver and is so arranged that, upon receipt of an electrical signal which exceeds a given threshold value, it will develop an output signal having a short time duration which is followed by a relatively long quiescent period. The threshold value is chosen in relation to the expected amplitude of the electrical signal so that low amplitude signals due to acoustic coupling of the casing will trigger the first circuit on the second cycle of the electrical signal while signals due to "free" casings will trigger the first circuit on the first cycle of the electrical signal. A second signal generating circuit is coupled between the first circuit and indicating means and is arranged to be operative during a selected time interval after the transmitter has been actuated. The selected time interval is such that the second circuit is rendered operative coincident with the time that the second cycle of an electrical signal is developed by the receiver. Hence, if the acoustic energy travels through "free" casing, the first cycle of the electrical signal will trigger the first circuit to produce the short time duration output and the circuit will thereafter be in a quiescent condition when the second circuit is actuated so that no indication is produced. However, if the electrical signal is of lower amplitude by attenuation, then the second circuit will be operatively conditioned prior to the triggering of the first circuit by the second cycle of the electrical signal so that the second circuit will produce an output indicating that the casing is acoustically coupled to the borehole.

In another aspect of the present invention, a time interval between a known time reference and the first instant that the amplitude of the electrical signal exceeds a given threshold value is obtained to measure the cycles of the electrical signal thereby providing an indication of the attenuation of the electrical signal and the relative bonding of the cement.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

Figure 1:
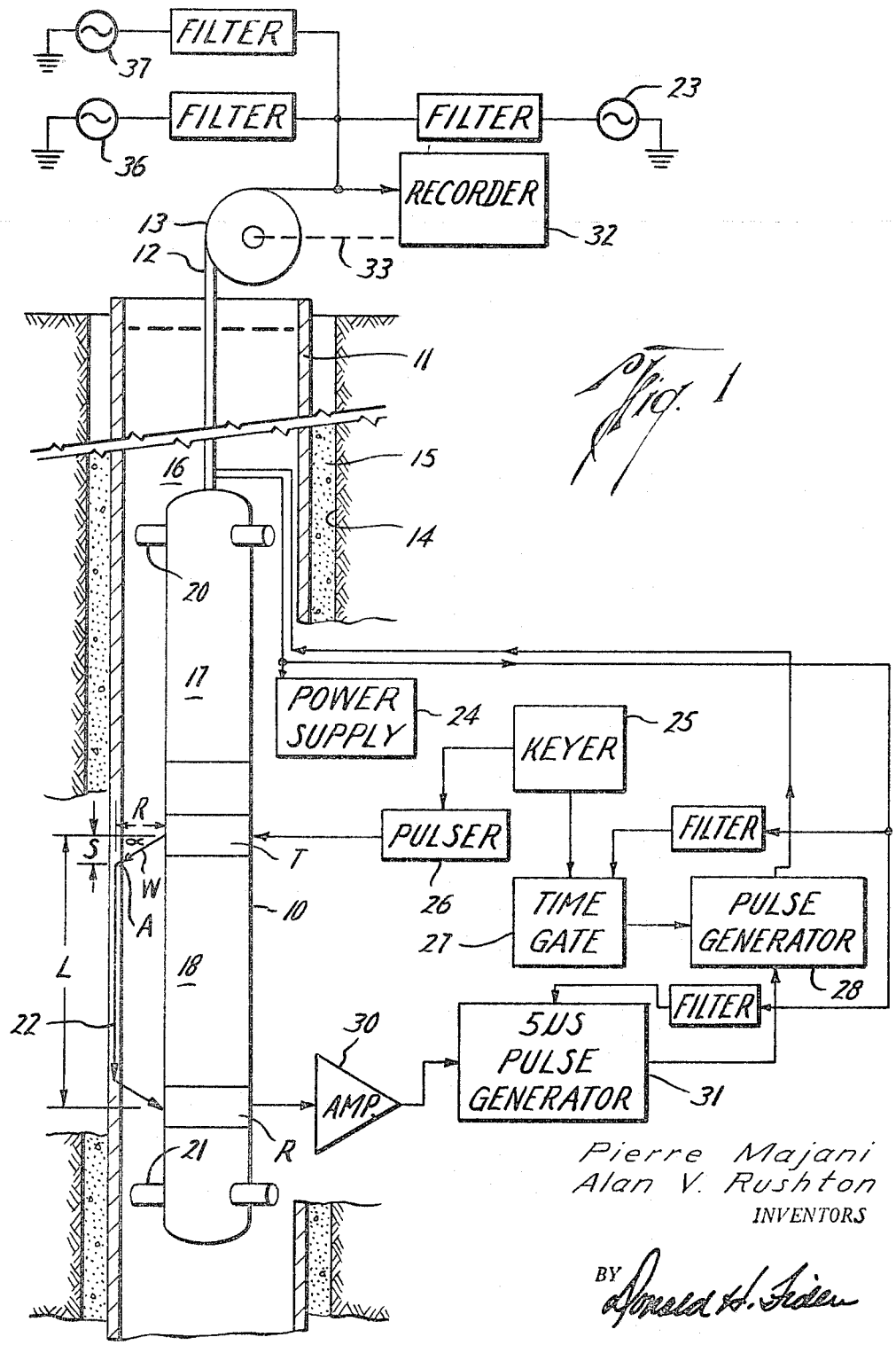
FIG. 1 is a schematic view of apparatus embodying the present invention disposed in a borehole as illustrated in the cross-section through the earth formations.

Referring now to FIG. 1, apparatus 10 embodying the present invention is suspended in a casing 11 by means of a monocable 12. Cable 12 and a winch 13 located at the earth's surface serve to lower and raise the apparatus through the casing in a conventional manner. Casing 11 is disposed in a borehole 14 and suitably cemented thereto by a column or body of cement 15 and generally contains a fluid 16 such as water or a drilling fluid.

Apparatus 10 includes upper and lower sections 17 and 18, the upper section 17 being fluid-tight and containing the electrical components of the apparatus and the lower section 18 containing longitudinally spaced transducers, which may be transmitter T and receiver R. The transmitter T and receiver R, for example, may be constructed and arranged as disclosed in the copending application of Frank Kokesh, Serial No. 745,548 filed on June 30, 1958, now U.S. Patent No. 3,231,041.

As disclosed in the aforesaid application, magnetostrictive transducers are spaced from one another and mounted on a medium of low acoustic velocity so that acoustic energy first arriving at a transducer is that traveling through adjacent media and not along the spacing medium. In general, the transmitter T is energized by a sharp pulse of electrical energy to produce a sharp pulse of acoustic energy which travels many paths outwardly from the transmitter through the fluid to the casing. If the casing is cemented and bonded to the borehole, the acoustic coupling of the casing will pass acoustic energy into the cement and the formations as well as the casing. If there is no cement bonding to the casing, then the acoustic energy will be essentially confined to the casing.

The apparatus 10 is centered with centralizing means such as rubber fingers 20, 21 to insure a geometrically uniform propagation of acoustic energy to the walls of the casing which insures a consistency and a reliability of the electrical signal developed by the receiver.

A source of alternating current 23, for example, 60 cycles A.C., at the earth's surface is coupled via the monocable 12 to a conventional power supply 24 in the apparatus 10 which supplies the operating potentials for the various electrical components of the apparatus.

In the apparatus 10, a keyer circuit 25 is coupled to the transmitter T via a pulser 26 to produce repetitive sound pulses. The keyer circuit 25 may typically be a relaxation oscillator which has, for example, a repetition rate of 10 pulses per second while the pulser 26 may be thyratron and condenser arranged to develop a sharp burst of electrical energy. The keyer circuit 25 also supplies a trigger pulse to a gate circuit 27 which may typically be a conventional monostable multivibrator. The gate circuit 27, when actuated, provides a control pulse for a predetermined period of time which prevents a conventional signal pulse generator 28 from operating.

The receiver R is coupled via an amplifier 30 to a pulse generating circuit 31 which has a detecting threshold arranged so that whenever the electrical signal from the receiver exceeds the threshold, a pulse having a short time interval is produced. A pulse output from the pulse circuit 31, in turn, actuates the signal pulse generator 28 to develop a signal output pulse which is transmitted via the monocable 12 to indicating means such as a recorder 32 located at the earth's surface in a customary manner. The pulse circuit 31 is of conventional design and may, for example, be arranged to develop a pulse of 5 microseconds duration and then remain in a quiescent condition for about 100 milliseconds.

The control pulse of the gate circuit 27 has a time duration which is greater than the time interval required for an acoustic pulse to pass through unbonded or "free" casing so that such an acoustic pulse will cause the receiver to develop an electrical signal which triggers the pulse circuit 31 prior to the time that the output pulse generator 28 is operatively conditioned. Thus, the recorder is unresponsive to acoustic pulses traversing "free" casing.

The recorder 32 is mechanically driven by a drive connection (indicated by the dashed line 33) to the winch 13 so as to be responsive to travel of the cable and so that the output pulses of pulse generator 28 are recorded against a depth base as the apparatus 10 passes along the casing.

By way of illustration, the following example will serve to clarify the timing relationship of the control pulse of gate circuit 27. The shortest time in which acoustic energy can travel from the transmitter to the receiver is shown by path 22. The time required for energy to travel from the transmitter to the casing may be determined from the ray or arrow W which is at an angle $\alpha$ relative to a horizontal plane through the casing. The angle $\alpha$ can be calculated as follows:

$$\sin \alpha = \frac{V_{\text{fluid}}}{V_{\text{casing}}} \qquad (1)$$

where $V_{\text{fluid}}$ is equal to the acoustic velocity of the fluid and $V_{\text{casing}}$ is equal to the acoustic velocity of the casing. For example, if the fluid is water with a velocity of 5000 f.p.s. and the casing is steel with a velocity of 17,500 f.p.s., the angle $\alpha$ will be equal to 16°20′. If the transmitter T and receiver R are magnetostrictive devices, for example, they may have a given diameter of say, 3 inches. Thus, in a 7-inch casing, for example, the spacing R between the apparatus and casing will be 2 inches. Hence, knowing the spacing R and angle $\alpha$, the length of ray W may be calculated and, of course, the length or distance W divided by the velocity of the fluid will give the shortest travel time $t_w$ through the fluid.

With the spacing R, the length of path W and angle known, the distance S between point A and a horizontal plane is easily calculated. Hence, with a given span L between the transmitter and receiver, the shortest time $t_c$ through the casing is equal to:

$$t_c = \frac{L - 2S}{V_{\text{casing}}} \qquad (2)$$

The shortest total time ($t_{\text{total}}$) is then equal to:

$$t_{\text{total}} = t_c + 2t_w \qquad (3)$$

From the foregoing, it will be appreciated that the shortest total time required for an acoustic signal to pass through unbonded casing of given diameter may be calculated. Thus, an appropriate time delay may be set into the gate circuit 27 so that pulse generator 28 is operably conditioned substantially coincident with the development of the second cycle of the signal.

Figure 3:
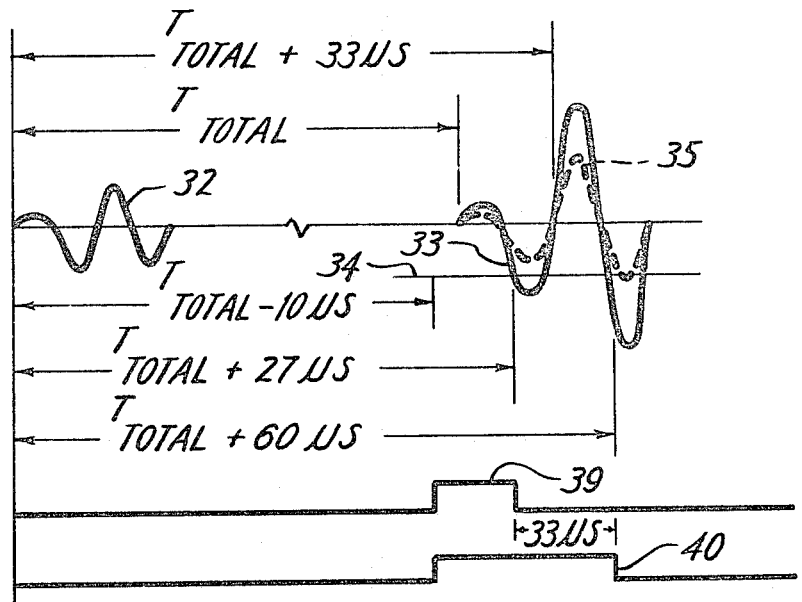
FIG. 3 is a typical illustration of signals of the apparatus of FIG. 1 against a time base.

In a typical operation of the above-described apparatus, as the apparatus 10 is passed through the borehole, repetitive acoustic pulses are produced by transmitter T and travel through various paths to the receiver R, a typical wave form 32 being shown in FIG. 3. In accordance with the above teachings, the shortest total travel time ($t_t$) for acoustic energy to travel between transmitter T and receiver R when the casing is "free" or unbonded may be calculated. If the frequency of the acoustic pulse is, say 30 kilocycles, then the period of one cycle of the electrical signal will be about 33 microseconds. Hence, the time gate 27 may be set to operatively condition the signal pulse generator 28 for operation after a time interval equal to $t_t + 33$ microseconds (FIG. 3) following the acoustic pulse generated by the transmitter T in response to keyer 25. Thus, if the casing is "free" or unbonded, the pulse circuit 31 is actuated by the first cycle of the electrical signal 33 which exceeds the threshold 34 just prior to the time that the pulse generator 28 is operative. Hence, pulse generator 28 does not produce an output signal. However, if the casing is bonded to the cement, the electrical signal is attenuated (indicated by dashed line 35) so that the second or subsequent cycles of the electrical signal exceed threshold 34 to trigger the pulse circuit 31 at a time when the pulse generator 28 is operative thereby producing an output pulse to the surface recorder 32 indicating the presence of acoustic coupling or cement bonding to the casing.

In the above system, both the threshold level of generator 31 and time delay of gate 27 may be adjustably controlled from the surface by means of A.C. voltage generators. In particular, a generator 36, for example, having a frequency of 450 c.p.s. may be coupled to the cable 12 and the voltage suitably rectified in the gate 27 to provide a control for the time interval of the delay pulse. Similarly a generator 37 coupled to cable 12 may supply a voltage which is rectified in generator 31 to provide a control for the threshold level. Suitable filters may also be provided for isolation of the generated signals from one another in a well-known manner.

Figure 2:
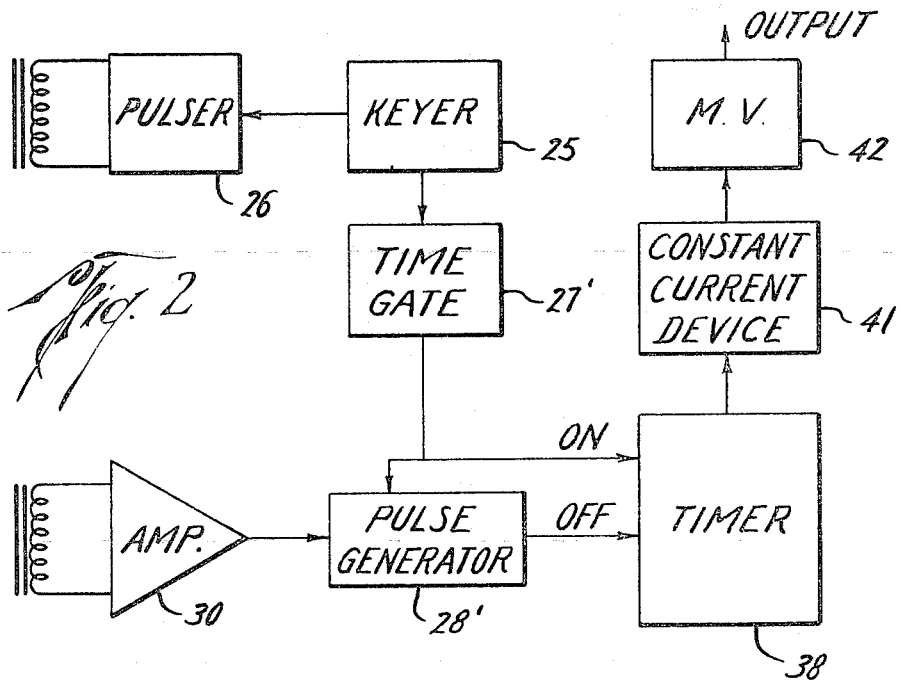
FIG. 2 is a schematic view of another embodiment of the present invention.

Referring now to FIG. 2, in this embodiment of the present invention, the keyer 25 pulses the transmitter T via the pulser 26 as above described. The keyer also supplies a trigger pulse to gate circuit 27' which, after a preselected period of time, operatively conditions a pulse generator 28' for operation and also turns a timer gate 38 "on." Timer gate 38 may, for example, be a bistable multivibrator which develops an output pulse of a time duration dependent upon the time duration between pulses applied to its input. The preselected period of time delay of gate circuit 27', fore example, may be $t_t$ minus 10 microseconds (FIG. 3) so that prior to the time of the first possible arrival, the pulse generator 28' is operatively conditioned and the timer gate 38 is turned "on" at the preselected time thus starting a time measurement from a selected reference point.

The receiver R is coupled via an amplifier 30 to the pulse generator 28' so that acoustic energy intercepting the receiver will develop an electrical signal. Pulse generator 28' is provided with a threshold 34 (FIG. 3) so that when the signal exceeds the threshold, a pulse output is applied to timer gate 38 turning the gate 38 "off." Thus, if waveform 33 is applied to the pulse generator 28', the timer gate 38 will have a pulse output as shown at 39 (FIG. 3). However, if the signal is attenuated, the waveform 35 will produce a pulse output as shown at 40 (FIG. 3). The pulse output of gate 38 may be sent to the surface to provide indications or it can be applied to a constant current device 41 which charges a condenser (not shown) in the grid circuit of a free running multivibrator 42. The multivibrator 42 is arranged so that if generator 28' triggers on waveform 33, one output pulse is produced and if waveform 35 triggers generator 28', two output pulses are produced. In this manner, the number of pulses obtained will provide a count of the cycles required to trigger generator 28' and thus provide an indication of the relative attenuation of the developed signal. The threshold level of generator 28' and the time delay of gate 27 may similarly be adjustably controlled in the manner above described.

Although the foregoing discussion has been in relation to casing which is acoustically coupled to a borehole by a column of cement, it should be apparent that the present invention is also applicable for "free point" indications where a casing is "stuck" in a bore by mud, cavings, debris or formations packed about the casing, as this will produce relative attenuation of the transmitted acoustic energy.

While particular embodiments of the present invention have been shown and described, it is apparent that changes and modifications may be made without departing f om this invention in its broader aspects, and therefore the aim in the appended claims is to cover all such changes and modifications as fall within the true spirit and scope of this invention.

What is claimed is:

1. In a method of detecting the quality of acoustic coupling at a location of material intermediate of a casing and a borehole traversing earth formations the steps of: generating a pulse of acoustic energy within a casing to travel along said casing between spaced first and second locations, intercepting at the second location the pulse of acoustic energy traveling along said casing and deriving an indication of an amplitude characteristic of a preselected portion of said intercepted acoustic pulse occurring during a predetermined time interval following the first arrival of acoustic energy at said second location indicative of the quality of acoustic coupling of material intermediate of the casing and the borehole between the spaced locations.

2. In a method of determining locations behind a casing a borehole traversing earth formations at which material is acoustically coupled to the casing, the steps of: periodically generating pulses of acoustic energy at first locations along the casing and transmitting at least a part of the acoustic energy of each pulse along said casing, respectively intercepting at second locations along the casing at a predetermined spaced relationship to said first locations the pulses of acoustic energy transmitted along said casing and deriving indications of an amplitude characteristic of a preselected portion of each of said intercepted acoustic pulses occurring during a predetermined time interval at said second locations following the first arrival of acoustic energy which indications are indicative of the condition of acoustical coupling of material to the casing.

3. In a method of determining locations behind a casing in a borehole traversing earth formations at which material is acoustically coupled to the casing, the steps of: periodically generating pulses of acoustic energy at first locations along a casing and transmitting at least a part of the acoustic energy of each pulse along said casing, respectively intercepting at second locations along the casing at a predetermined spaced relationship to said first locations the pulses of acoustic energy transmitted along said casing, deriving signals in response to the occurrence during selected time intervals after respective generated acoustic energy pulses of predetermined portions of said intercepted pulses having amplitudes exceeding a given amplitude, which signals are indicative of the condition of acoustical coupling of material to the casing.

4. In a method of determining locations behind a casing in a borehole traversing earth formations at which materials are acoustically coupled to the casing, the steps of: periodically generating pulses of acoustic energy at first locations along the casing and transmitting at least a part of the acoustic energy to each pulse along said casing, respectively intercepting at second locations along the casing at a fixed spaced relationship to said first locations the pulses of acoustic energy transmitted along said casing, deriving signals representative of an amplitude characteristic of a preselected portion of each of said intercepted acoustic pulses occurring during a predetermined time interval at said second locations following the first arrival of acoustic energy, moving said locations along the length of the casing, and distinguishing between the amplitude of characteristic signals derived in response to acoustic energy passing through a casing acoustically coupled to a borehole and the amplitude of characteristic signals derived in response to acoustic energy passing through casing which is not acoustically coupled to a borehole during said predetermined time intervals as said locations are moved along the casing.

5. In a method of detecting the quality of acoustic coupling of a cement sheath to a casing in a borehole traversing earth formations, the steps of generating a pulse of acoustic energy at a first location along the borehole and transmitting at least a part of said acoustic energy along the casing, intercepting at a second location along said borehole spaced a fixed distance from said first location the acoustic energy transmitted along said casing, developing an electrical signal representative of said intercepted energy in the form of an alternating wave having a plurality of alternations successively increasing in amplitude, establishing a threshold level at a value less than the amplitude of a preselected one of said alternations resulting from a relatively poor bond between said sheath and casing but greater than the amplitude of said preselected alternation resulting from a relatively good bond therebetween, and generating an output indication if said preselected alternation does not exceed said threshold level, to indicate that the cement and casing are well bonded between said first and second locations.

6. In a method of detecting the quality of acoustic coupling of a cement sheath to a casing in a borehole traversing earth formations, the steps of generating a pulse of acoustic energy at a fixed location along the borehole and transmitting at least a part of said acoustic energy along the casing, intercepting at a second location along said borehole spaced a fixed distance from said first location the acoustic energy transmitted along said casing, developing an electrical signal representative of said intercepted energy in the form of an alternating wave having a plurality of alternations successively increasing in amplitude, establishing a threshold level at a value less than the amplitude of a preselected one of said alternations resulting from a relatively poor bond between said sheath and casing but greater than the amplitude of said preselected alternation resulting from a relatively good bond therebetween, comparing said preselected alternation and a succeeding alternation in the same direction with said threshold level, and generating an output indication if said succeeding alternation only exceeds said threshold level, to indicate that the cement and casing are well bonded between said first and second locations.

7. The method of locating zones of bonding between well pipe and surrounding material with the aid of acoustic energy transmitted along the well pipe, the acoustic energy transmitting characteristics of the well pipe being variable along its length in accordance with the quality of the bond to the surrounding material, comprising the steps of generating pulses of acoustic energy at intervals along a well pipe substantially along the axis thereof and transmitting at least part of said energy along said well pipe, detecting the arrival of such acoustic pulses at a point spaced substantially a fixed distance along said axis from the points of generation to develop a corresponding electric signal, detecting only excursions of said signal which occur at a selected time following generation of a pulse, which time is representative of the travel time of acoustic energy along the pipe, and recording as a function of position along the pipe, first indications corresponding to the occurrence of the detected excursions at a fixed time following generation of the detected pulses required for such pulses to travel said fixed distance and second indications corresponding to the non-detection of such excursions at said fixed time following generation of the detected pulses.

8. The method of locating zones of bonding between well pipe and surrounding material with the aid of acoustic energy transmitted along the well pipe, the acoustic energy transmitting characteristics of the well pipe being variable along its length in accordance with the quality of the bond to the surrounding material, comprising the steps of generating pulses of acoustic energy at intervals along a well pipe substantially along the axis thereof and transmitting at least part of said energy along said well pipe, detecting the arrival of such acoustic pulses at a point spaced substantially a fixed distance along said axis from the points of generation to develop a corresponding electric signal, detecting only excursions of said signal which occur at a selected time following generation of a pulse, which time is representative of the travel time of acoustic energy along the pipe, and recording as a function of position along the pipe, first indications corresponding to the occurrence of the detected excursions at a first fixed time following generation of the detected pulses required for such pulses to travel said fixed distance over a section of free pipe and second indications corresponding to the detection of excursions at a second fixed time following generation of the detected pulses required for such pulses to travel said fixed distance over a section of pipe which is acoustically bonded to surrounding material.

9. The method of locating zones of bonding between well pipe and cement with the aid of acoustic energy transmitted along the well pipe, the acoustic energy transmitting characteristics of the well pipe being variable along its length in accordance with the quality of the bond to the surrounding cement, comprising the steps of generating pulses of acoustic energy at intervals along a well pipe substantially along the axis thereof and transmitting at least part of said energy along said well pipe, detecting the arrival of such acoustic pulses at a point spaced substantially a fixed distance along said axis from the points of generation to develop a corresponding electric signal, detecting only excursions of said signal which occur at a selected time following generation of a pulse, which time is representative of the travel time of acoustic energy along the pipe, and recording as a function of position along the pipe, first indications corresponding to the occurrence of the detected excursions at a fixed time following generation of the detected pulses required for such pulses to travel said fixed distance and second indications corresponding to the non-detection of such excursions at said fixed time following generation of the detected pulses.

10. The method of investigating the quality of the bonding of an annulus of cement between a casing and a borehole comprising the steps of generating a sharp pulse of acoustic energy at a first location in the casing; transmitting at least a part of said energy along said casing; intercepting acoustic energy from said casing at a second location spaced from said first location; translating said intercepted acoustic energy into electrical signals, detecting signals representing energy passing through said casing where the casing is imperfectly bonded to the formations by the annulus of cement by setting a detecting level which is exceeded only by the amplitude of signals representing energy passing through said casing which is imperfectly bonded to the earth formations by the annulus of cement and is greater than the amplitude of signals representing energy passing through casing which is cement bonded to the earth formations.

11. The method of locating the point fixation or stuck point of a casing in a well bore comprising lowering into the casing an acoustic device; generating pulses of acoustic energy at points along the well casing substantially along the the axis of the casing; transmitting at least a part of said energy along said casing; detecting the arrival of acoustic pulses at least at one point spaced substantially at a fixed distance along said axis from the points of generation to develop a corresponding electric signal, detecting only excursions of said signal which occur at a time following generation of a pulse representative of the travel time of acoustic energy in the casing; and recording as a function of position along the casing, first indications corresponding to the occurrence of the detected excursions at a fixed time following generation of the detected pulses required for such pulses to travel said fixed distances and second indications corresponding to the non-detection of such excursions at said fixed time following generation of the detected pulses.

12. The method of locating zones of bonding between well pipe and surrounding material with the aid of acoustic energy transmitted along the well pipe, the acoustic energy transmitting characteristics of the well pipe being variable along its length in accordance with the quality of the bond to the surrounding material, comprising the steps of generating pulses of acoustic energy at intervals along a well pipe substantially along the axis thereof and transmitting at least part of said energy along said well pipe, detecting the arrival of such acoustic pulses at least at one point spaced substantially a fixed distance along said axis from the points of generation to develop a corresponding electrical signal, detecting only excursions of said electrical signal which occur at a time following generation of a pulse representative of the travel time of acoustic energy along the pipe, deriving from said excursions further electrical signals indicative of the acoustic energy transmitting characteristics of said well pipe, and recording said further electrical signals as a function of position along the pipe to provide an indication of the quality of the bond between the pipe and the surrounding material.

13. The method of locating zones of bonding between well pipe and surrounding material with the aid of acoustic energy transmitted along the well pipe, the acoustic energy attenuation characteristic of the well pipe being dependent upon the quality of the bond to the surrounding material, the better the bond the greater the attenuation, comprising the steps of generating pulses of acoustic energy at intervals along a well pipe substantially along the axis thereof and transmitting at least a part of said energy along said well pipe, detecting the arrival of such acoustic pulses at a point spaced substantially a fixed distance along said axis from the points of generation to develop a corresponding electrical signal, detecting only excursions of said electrical signal which occur at a time following generation of a pulse representative of the travel time of acoustic energy along the pipe, deriving from said excursions further electrical signals indicative of the attenuation of said acoustic energy provided by said well pipe, and recording said further electrical signals as a function of position along the pipe to provide an indication of the quality of the bond between the pipe and the surrounding material.

References Cited by the Examiner

UNITED STATES PATENTS

| | | | |
|---|---|---|---|
| 2,200,476 | 5/1940 | Mounce | 181—0.53 |
| 2,233,992 | 3/1941 | Wyckoff | 181—0.53 |
| 2,604,181 | 7/1952 | Basham et al. | 181—0.53 |
| 2,704,364 | 3/1955 | Summers | 181—0.53 |
| 2,794,512 | 6/1957 | Martin | 181—0.53 |
| 2,813,590 | 11/1957 | McDonald | 181—0.53 |
| 2,857,011 | 10/1958 | Summers | 181—0.53 |
| 2,931,455 | 4/1960 | Loofbourrow | 181—0.53 |
| 3,050,150 | 8/1962 | Tixier | 181—0.53 |
| 3,174,577 | 3/1965 | Holley | 340—18 X |

BENJAMIN A. BORCHELT, *Primary Examiner*

CHARLES W. ROBINSON, CHESTER L. JUSTUS, SAMUEL FEINBERG, *Examiners.*

S. J. TOMSKY, A. E. HALL, J. W. MILLS, R. M. SKOLNIK, M. F. HUBLER, *Assistant Examiners.*